US012795032B2

(12) United States Patent
Hirose

(10) Patent No.: US 12,795,032 B2
(45) Date of Patent: Nov. 10, 2026

(54) INFORMATION PROCESSING SYSTEM AND INFORMATION PROCESSING TERMINAL CAPABLE OF PREVENTING LEAKAGE OF INFORMATION

(71) Applicant: FUJIFILM Business Innovation Corp., Tokyo (JP)

(72) Inventor: Akira Hirose, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/297,010

(22) Filed: Apr. 7, 2023

(65) Prior Publication Data

US 2024/0214501 A1 Jun. 27, 2024

(30) Foreign Application Priority Data

Dec. 22, 2022 (JP) ................................ 2022-205823

(51) Int. Cl.

*H04N 1/32* (2006.01)
*H04N 1/00* (2006.01)
*H04N 1/21* (2006.01)
*H04N 1/44* (2006.01)

(52) U.S. Cl.

CPC ......... *H04N 1/324* (2013.01); *H04N 1/00244* (2013.01); *H04N 1/217* (2013.01); *H04N 1/32272* (2013.01); *H04N 1/444* (2013.01)

(58) Field of Classification Search

CPC .... H04N 1/324; H04N 1/00244; H04N 1/217; H04N 1/32272; H04N 1/444

See application file for complete search history.

(56) References Cited

U.S. PATENT DOCUMENTS

2016/0277631 A1* 9/2016 Mori ..................... G06F 3/1273
2018/0032708 A1* 2/2018 Mori ..................... G06F 21/608

FOREIGN PATENT DOCUMENTS

JP 2019148843 9/2019

* cited by examiner

*Primary Examiner* — Nicholas Pachol

(74) *Attorney, Agent, or Firm* — JCIPRNET

(57) ABSTRACT

An information processing system includes: a server including a first processor configured to function as a virtual device that is provided on a one-to-one basis with a predetermined information processing apparatus and mediates exchange of information between an application and the information processing apparatus; the information processing apparatus including a second processor, in a case of exchanging predetermined confidential information with the application via the virtual device, the second processor configured to exchange the information by converting the information into a format in which the information is to be referred to by the information processing apparatus and the application and is not to be referred to by the virtual device; and an information processing terminal including a third processor configured to function as the application, and exchange the information by converting the information into a format in which the information is to be referred to by the information processing terminal and the application and is not to be referred to by the virtual device, in a case of exchanging the confidential information with the information processing apparatus via the virtual device.

4 Claims, 12 Drawing Sheets

INFORMATION PROCESSING SYSTEM AND INFORMATION PROCESSING TERMINAL CAPABLE OF PREVENTING LEAKAGE OF INFORMATION

CROSS-REFERENCE TO RELATED APPLICATIONS

This application is based on and claims priority under 35 USC 119 from Japanese Patent Application No. 2022-205823 filed Dec. 22, 2022.

BACKGROUND

(i) Technical Field

The present disclosure describes an information processing system and an information processing terminal.

(ii) Related Art

JP2019-148843A relates to a device management apparatus including state management means for, in a case where a state change request including a target value indicating a target of a state to be changed by a device and a scheduled time is received, executing a predetermined operation to achieve the target value at the scheduled time, being connected with a device that returns a report value indicating a state after execution via a communication network, transmitting a state change request to the device in a case where the state change request is input, determining whether or not the report value is received after the scheduled time has elapsed in a case where a device status inquiry is input, and transmitting an estimated value indicating a state estimated from the predetermined operation in a case of not being received.

SUMMARY

A technique in which a user's application and an information processing apparatus transmit and receive information via a virtual device on a server provided corresponding to a predetermined information processing apparatus is considered. In this technique, the administrator of the virtual device can browse the information transmitted and received between the information processing apparatus and the application.

Aspects of non-limiting embodiments of the present disclosure relate to an information processing system and an information processing terminal capable of preventing leakage of information transmitted and received between an information processing apparatus and an application in a virtual device that mediates the transmission and reception of information between the application and the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: a server including a first processor configured to function as a virtual device that is provided on a one-to-one basis with a predetermined information processing apparatus and mediates exchange of information between an application and the information processing apparatus; the information processing apparatus including a second processor, in a case of exchanging predetermined confidential information with the application via the virtual device, the second processor configured to exchange the information by converting the information into a format in which the information is to be referred to by the information processing apparatus and the application and is not to be referred to by the virtual device; and an information processing terminal including a third processor configured to function as the application, and exchange the information by converting the information into a format in which the information is to be referred to by the information processing terminal and the application and is not to be referred to by the virtual device, in a case of exchanging the confidential information with the information processing apparatus via the virtual device.

BRIEF DESCRIPTION OF THE DRAWINGS

Exemplary embodiment(s) of the present invention will be described in detail based on the following figures, wherein.

DETAILED DESCRIPTION

Figure 1:
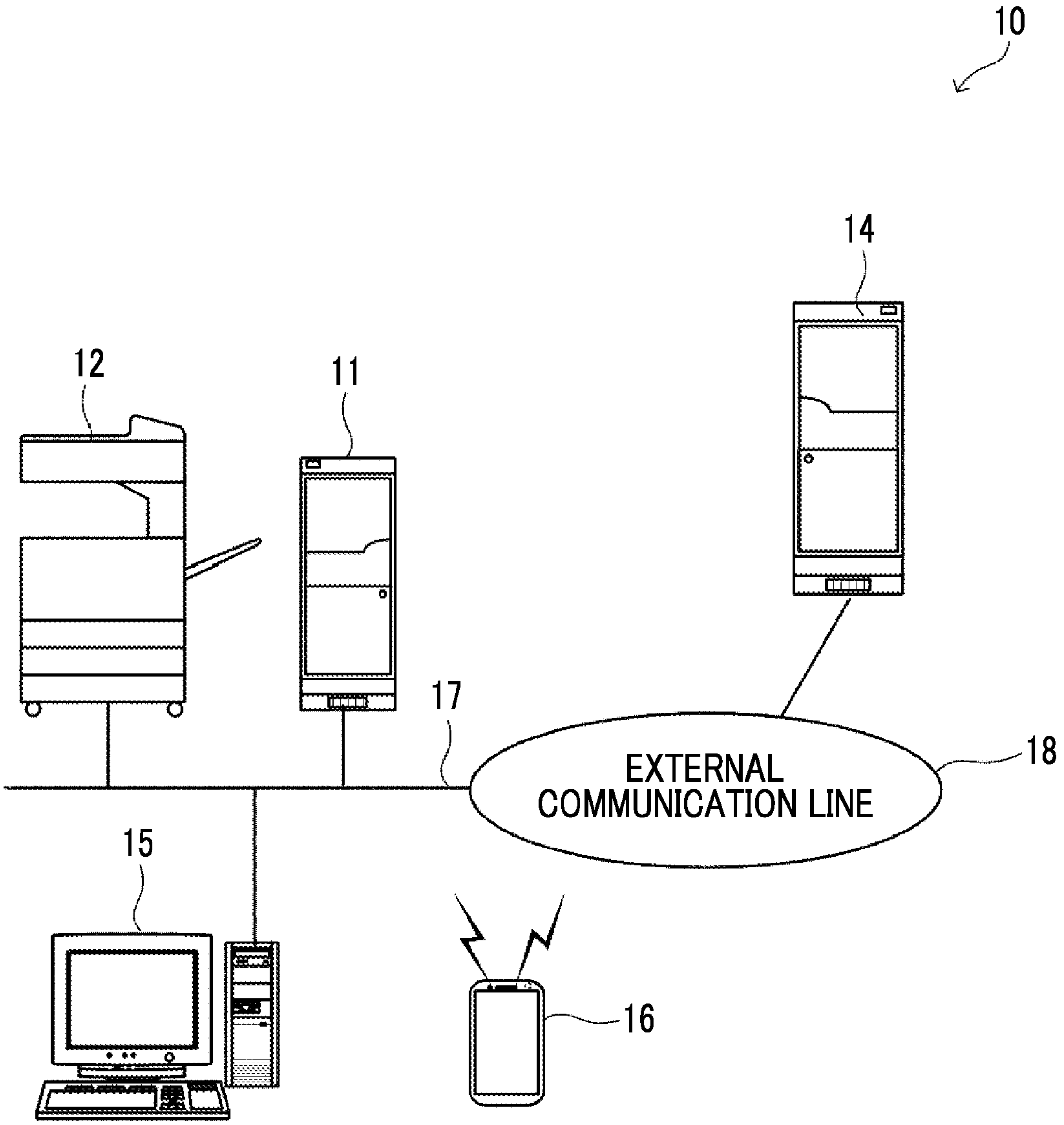
FIG. 1 is a diagram illustrating a schematic configuration of an image forming system according to the present exemplary embodiment.

Hereinafter, an example of the exemplary embodiment of the present disclosure will be described in detail with reference to the drawings. FIG. 1 is a diagram illustrating a schematic configuration of an image forming system according to the present exemplary embodiment. In the present exemplary embodiment, an image forming system 10 will be described as an example of the information processing system.

As illustrated in FIG. 1, the image forming system 10 according to the present exemplary embodiment includes a local server 11, an image forming apparatus 12 as an example of an information processing apparatus, a cloud server 14 as an example of a server functioning as a virtual device, a client terminal 15, and a communication terminal 16. In addition, in the present exemplary embodiment, the number of each of the local servers 11, the image forming apparatuses 12, the cloud servers 14, the client terminals 15, and the communication terminals 16 is one, but the number may be plural. Further, the local server 11 may be omitted. Further, the client terminal 15 and the communication terminal 16 correspond to an example of an information processing terminal.

The local server 11, the image forming apparatus 12, and the client terminal 15 are each connected to an internal communication line 17 such as a local area network (LAN) or an intranet. Further, the internal communication line 17 and the cloud server 14 are each connected to an external communication line 18 such as a wide area network (WAN) and the Internet. Further, the communication terminal 16 carried by the user can be connected to each of the internal communication line 17 and the external communication line 18. Each of the local server 11, the image forming apparatus 12, the cloud server 14, the client terminal 15, and the communication terminal 16 can mutually transmit and receive various types of data via the internal communication line 17 and the external communication line 18. In addition, as an example of the communication terminal 16, a mobile phone such as a smartphone, a notebook personal computer (PC), or the like is applied, and FIG. 1 shows an example of a mobile phone.

Figure 2:
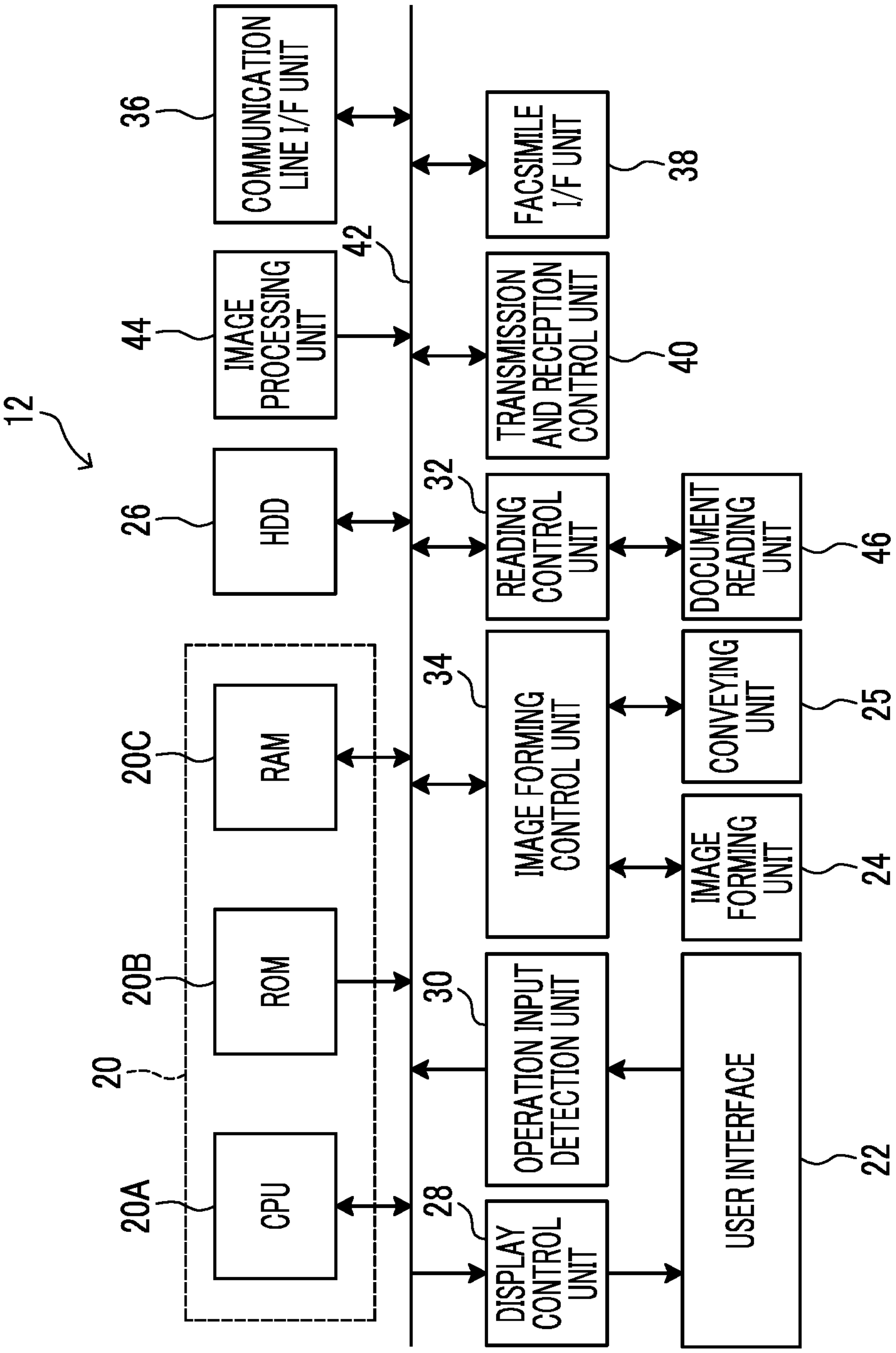
FIG. 2 is a block diagram showing a configuration of an electrical system of an image forming apparatus in the image forming system according to the present exemplary embodiment.

FIG. 2 is a block diagram showing the configuration of the electrical system of the image forming apparatus 12, in the image forming system 10 according to the present exemplary embodiment.

As shown in FIG. 2, the image forming apparatus 12 according to the present exemplary embodiment includes a control unit 20 including a central processing unit (CPU) 20A, a read only memory (ROM) 20B, and a random access memory (RAM) 20C. The CPU 20A controls the overall operation of the image forming apparatus 12. The RAM 20C is used as a work area or the like when various programs are executed by the CPU 20A. Various control programs, various parameters, and the like are stored in advance in the ROM 20B. The image forming apparatus 12 is electrically connected to each part of the control unit 20 via a system bus 42.

Further, the image forming apparatus 12 according to the present exemplary embodiment includes a hard disk drive (HDD) 26 for storing various types of data, application programs, and the like. Further, the image forming apparatus 12 includes a display control unit 28 that is connected to the user interface 22 and controls the display of various operation screens and the like on the display of the user interface 22. Further, the image forming apparatus 12 includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. In addition, in the image forming apparatus 12 according to the present exemplary embodiment, an example including the HDD 26 is described, but the present invention is not limited to this, and a non-volatile storage unit such as a flash memory may be provided.

Further, the image forming apparatus 12 according to the present exemplary embodiment includes a reading control unit 32 that controls an optical image reading operation by the document reading unit 46 and a document feeding operation by the document conveying unit, and an image forming control unit 34 that controls an image forming process by the image forming unit 24, and conveying of paper to the image forming unit 24 by the conveying unit 25. Further, the image forming apparatus 12 includes a communication line interface (communication line I/F) unit 36 that is connected to an internal communication line 17 and transmits and receives communication data to and from other apparatuses connected to the internal communication line 17, and an image processing unit 44 that performs various image processes. Further, the image forming apparatus 12 includes a facsimile interface (facsimile I/F) unit 38 that is connected to a telephone line (not shown) and transmits and receives facsimile data to and from the facsimile apparatus connected to the telephone line. Further, the image forming apparatus 12 includes a transmission and reception control unit 40 that controls transmission and reception of facsimile data via the facsimile interface unit 38. Then, in the image forming apparatus 12, the transmission and reception control unit 40, the reading control unit 32, the image forming control unit 34, the communication line interface unit 36, the facsimile interface unit 38, and the image processing unit 44 are electrically connected to the system bus 42.

With the above configuration, the image forming apparatus 12 according to the present exemplary embodiment accesses the RAM 20C, the ROM 20B, and the HDD 26 by the CPU 20A, respectively. Further, the image forming apparatus 12 controls the display of information such as an operation screen and various messages on the display of the user interface 22 via the display control unit 28, by the CPU 20A. Further, the image forming apparatus 12 controls the operations of the document reading unit 46 and the document conveying unit via the reading control unit 32, by the CPU 20A. Further, the image forming apparatus 12 controls the operations of the image forming unit 24 and the conveying unit 25 via the image forming control unit 34 and controls the transmission and reception of communication data via the communication line interface unit 36, by the CPU 20A, respectively. Further, the image forming apparatus 12 controls the transmission and reception of facsimile data via the facsimile interface unit 38 by the transmission and reception control unit 40, by the CPU 20A. Further, the image forming apparatus 12 grasps the operation contents in the user interface 22 based on the operation information detected by the operation input detection unit 30, and executes various controls based on the operation contents, by the CPU 20A.

Figure 3:
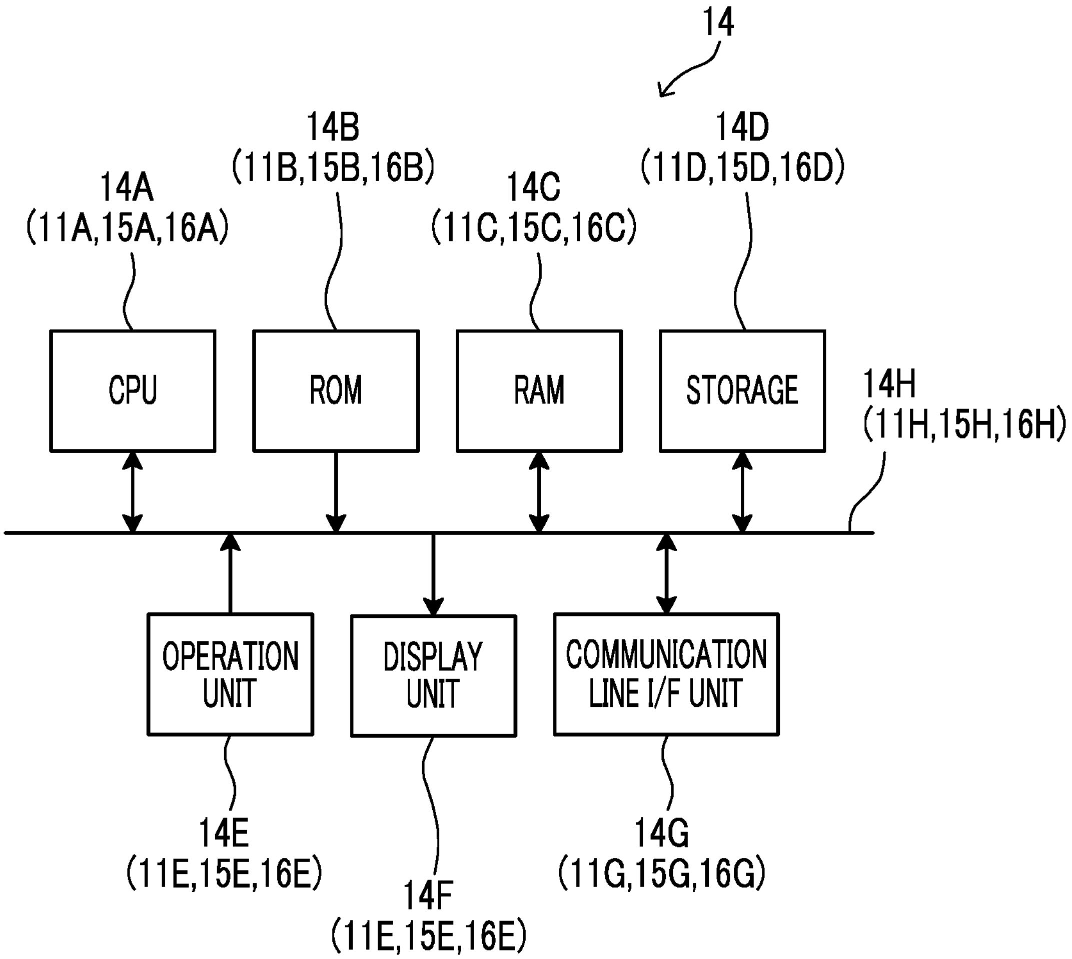
FIG. 3 is a block diagram showing a configuration of an electrical system of each of a local server, a cloud server, a client terminal, and a communication terminal according to the present exemplary embodiment.

Next, the configuration of the electrical system of each of the local server 11, the cloud server 14, the client terminal 15, and the communication terminal 16 in the image forming system 10 according to the present exemplary embodiment will be described. FIG. 3 is a block diagram showing a configuration of the electrical system of each of the local server 11, the cloud server 14, the client terminal 15, and the communication terminal 16 according to the present exemplary embodiment. Since the local server 11, the cloud server 14, the client terminal 15, and the communication terminal 16 basically have a general computer configuration, the cloud server 14 will be described as a representative, the description of the local server 11, the client terminal 15, and the communication terminal 16 is omitted, and only the corresponding reference numerals are shown in FIG. 3.

As shown in FIG. 3, the cloud server 14 according to the present exemplary embodiment includes a CPU 14A, a ROM 14B, a RAM 14C, a storage 14D, an operation unit 14E, a display unit 14F, and a communication line interface (I/F) unit 14G. The CPU 14A controls the overall operation of the cloud server 14. An information processing program for performing various control, various parameters, and the like are stored in advance in the ROM 14B. The RAM 14C is used as a work area or the like when various programs are executed by the CPU 14A. Various data, application programs, and the like are stored in the storage 14D. The operation unit 14E is used to input various types of information. The display unit 14F is used to display various types of information. The communication line interface unit 14G is connected to the external communication line 18 and transmits and receives various data to and from other apparatuses connected to the external communication line 18. Each part of the above cloud server 14 is electrically connected to each other via the system bus 14H. In the cloud server 14 according to the present exemplary embodiment, the storage 14D is provided as a storage unit, and as the storage 14D, for example, a non-volatile storage unit such as an HDD or a flash memory is applied. The communication line interface units 11G, 15G, and 16G of the local server 11, the client terminal 15, and the communication terminal 16 are connected to the internal communication line 17, and transmit and receive various types of data to and from other apparatuses connected to the internal communication line 17.

With the above configuration, the cloud server 14 according to the present exemplary embodiment accesses the ROM 14B, the RAM 14C, and the storage 14D by the CPU 14A, acquires various types of data by the operation unit 14E, and displays various types of information on the display unit 14F, respectively. Further, the cloud server 14 controls the transmission and reception of communication data via the communication line interface unit 14G, by the CPU 14A.

In the image forming system 10 according to the present exemplary embodiment configured as described above, for example, the local server 11, the image forming apparatus 12, and the client terminal 15 are provided in the company. Further, the communication terminal 16 enables the use of the image forming apparatus 12 from the outside via the cloud server 14.

The cloud server 14 provides a function of a virtual device that functions as the image forming apparatus 12 in cooperation with the image forming apparatus 12. Specifically, in the image forming system 10 according to the present exemplary embodiment, the CPU 14A on the cloud server 14 side is provided on a one-to-one basis with a physical device, and functions as a virtual device that mediates the transmission and reception of information between the application installed on a client terminal 15 or a communication terminal 16 of a customer and the physical device. In the following, the image forming apparatus 12 as an example of the physical apparatus may be referred to as a real device 12.

Figure 4:
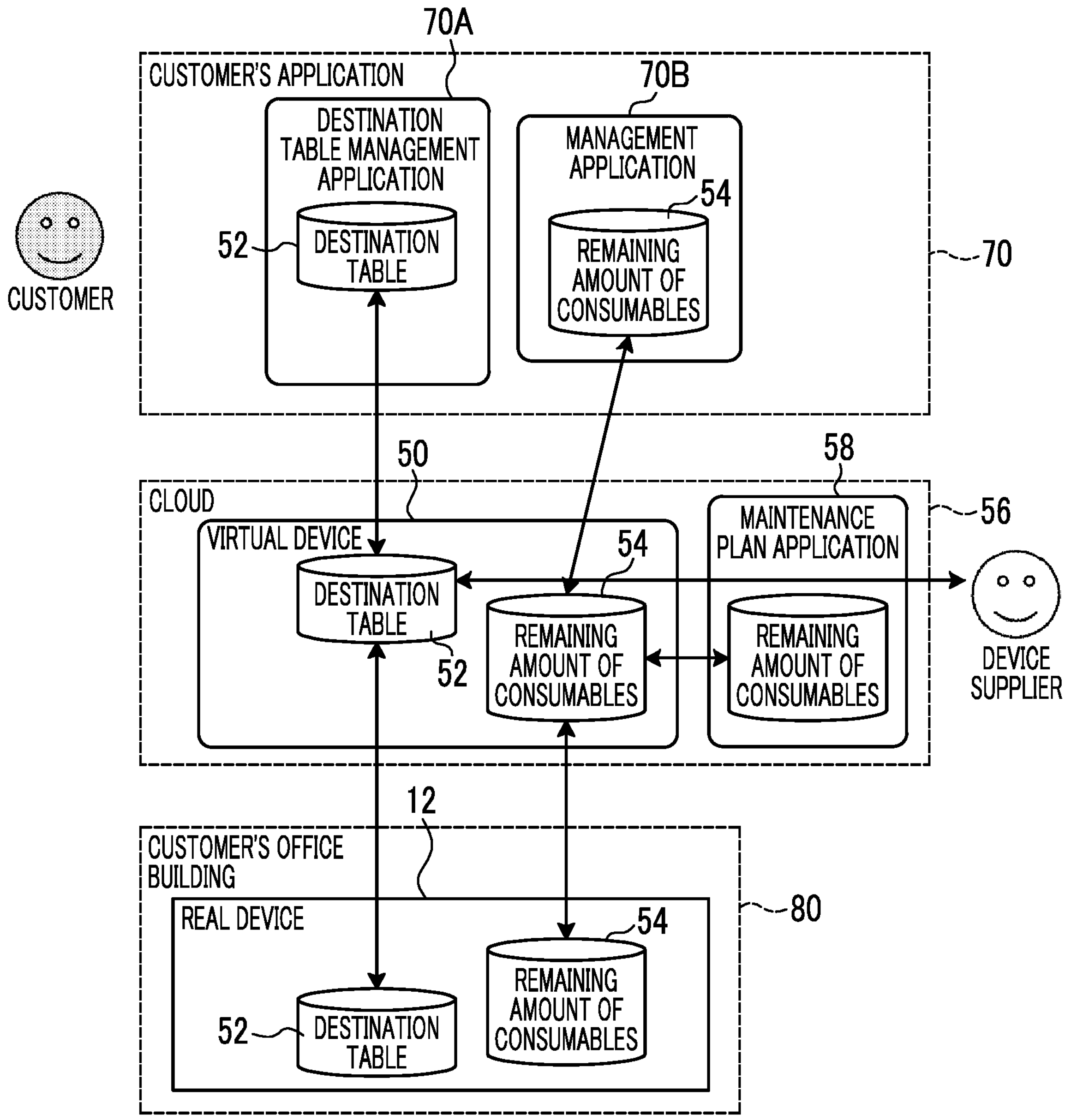
FIG. 4 is a diagram illustrating a virtual device.

The virtual device is a modeled device capable of holding or executing a function of expanding the function of the real device 12 in cooperation with the real device 12. For example, as shown in FIG. 4, the application 70 installed in an information processing terminal such as the client terminal 15 or the communication terminal 16 of a customer and the real device 12 installed in the customer's office building 80 exchange information via the virtual device 50 in the cloud 56.

The virtual device 50 synchronizes with the real device 12 at a predetermined timing. As an example of data to be synchronized, history data, status data, setting information, metadata such as machine information such as a device name and a model name, a destination table 52 registered in the real device 12, and data such as a remaining amount of consumables 54 are synchronized as synchronization targets. Since the virtual device 50 synchronizes with the real device 12, it is possible to remotely view the status of the real device 12 or change the setting, by using the client terminal 15, the communication terminal 16, or the like.

Further, the virtual device 50 performs processing with an external service via an Application Programming Interface (API). Examples of external services include machine management services and print services.

In the machine management service, a machine administrator in another business office or another country accesses the machine management service to check the state of the machine or change the setting. The machine management service transmits and receives information to and from the virtual device 50. In a case where the machine management service makes a state check request to the virtual device 50, the virtual device 50 returns the state information. In a case where the setting change request is made to the virtual device 50, the setting information of the virtual device 50 is updated. In a case where the real device 12 synchronizes with the virtual device 50, the real device 12 acquires the updated setting information and changes the setting of the real device 12.

In the print service, print data is uploaded to the print service from a mobile terminal such as the communication terminal 16, and the real device 12 that has acquired the print job via the virtual device 50 performs printing.

First Exemplary Embodiment

In the image forming system 10 configured as described above, data can be easily transmitted and received between the real device 12 and the application 70 via the virtual device 50. However, as shown in FIG. 4, a device supplier such as an administrator of the virtual device 50 can snoop on data transmitted and received between the real device 12 and the application 70.

FIG. 4 shows an example in which the device supplier provides, to the customer, a consumable management service for supplying consumables by maintaining and managing the virtual device 50, and a management service for managing the real device 12 by using the customer's application 70 (for example, updating of a destination table, or the like). In this case, the device supplier who is the administrator of the virtual device 50 can snoop on the private data such as the customer's destination table 52 or the like present in the virtual device 50.

Thus, in the present exemplary embodiment, in a case of exchanging information with the application 70 via the virtual device 50, and exchanging predetermined confidential information, the real device 12 exchanges information by converting the information into a format in which the information can be referred to by the real device 12 and the application 70 and cannot be referred to by the virtual device 50. Further, an information processing terminal such as a client terminal 15 or a communication terminal 16 of a customer functions as the application 70, and in a case where the information processing terminal exchanges information with the real device 12 via the virtual device 50, and exchanges predetermined confidential information, the information processing terminal exchanges information by converting the information into a format in which the information can be referred to by the information processing terminal and the real device 12 and cannot be referred to by the virtual device 50.

Specifically, the real device 12 stores the data transmitted and received between the real device 12 and the application 70 by distinguishing between public data that the virtual device 50 is permitted to refer to and private data corresponding to confidential information that the virtual device 50 is not permitted to refer to. In a case where the private data is transmitted and received to and from the virtual device 50, the private data is encrypted and then transmitted and received such that the private data cannot be referred to by the virtual device 50.

As an example of public data, the remaining amount of consumables managed by the management application 70B is applied in the present exemplary embodiment, and for example, the maintenance service company of the image forming apparatus 12 refers to and uses the remaining amount of consumables to plan the replenishment of consumables by the maintenance plan application 58. In addition, as an example of private data, a destination table is applied in the present exemplary embodiment. Then, in a case of transmitting and receiving the destination table 52 which is the private data between the application 70 and the virtual device 50, and the destination table 52 is transmitted and received as encrypted destination table data. As the private data corresponding to the confidential information, for example, log information representing the history of the real device 12 or the like may be applied in addition to the destination table 52.

Figure 5:
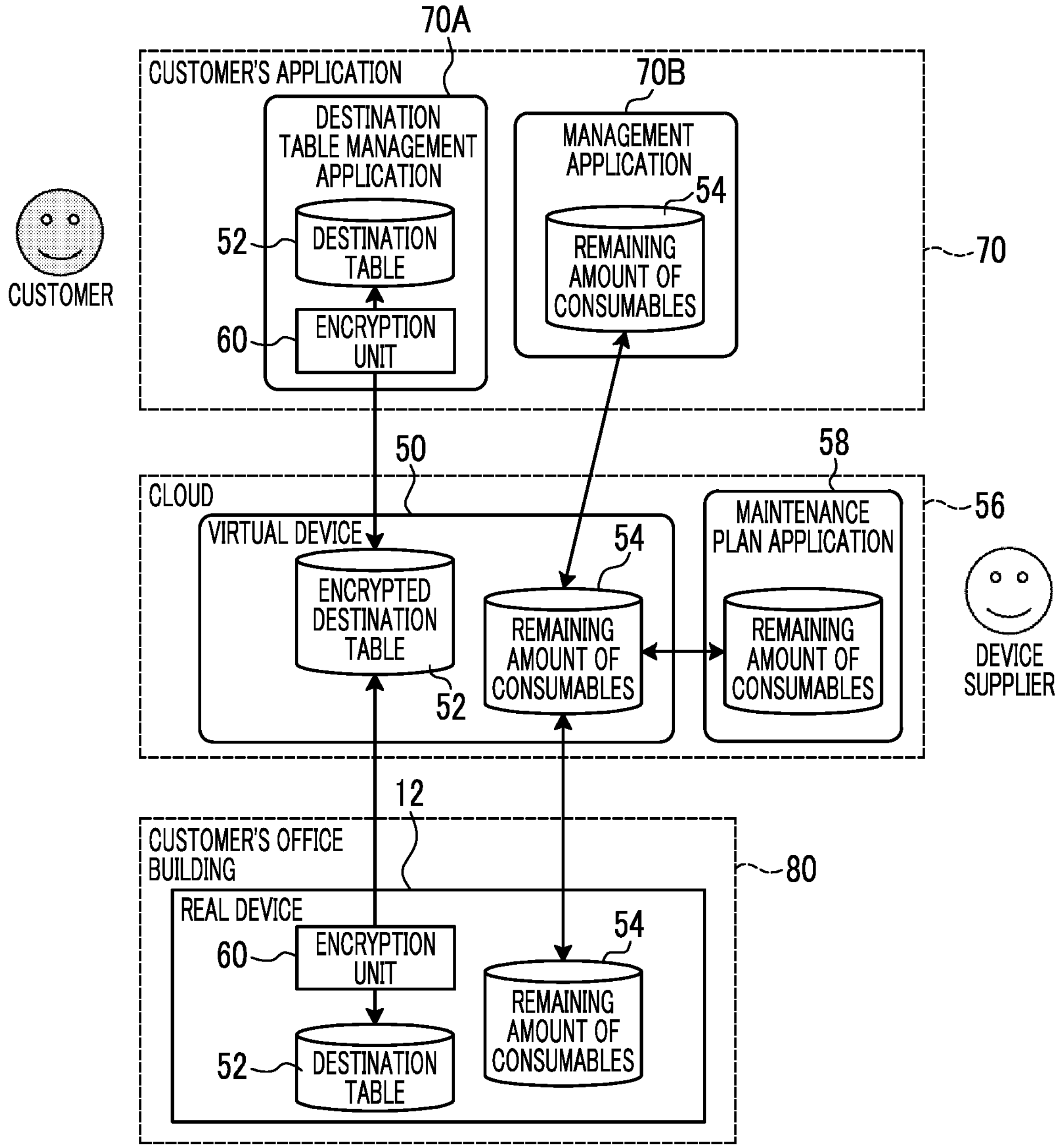
FIG. 5 is a diagram illustrating an image forming system according to the first exemplary embodiment.

Specifically, as shown in FIG. 5, the real device 12 and the application 70 are provided with the function of the encryption unit 60, and private data, for which the virtual device 50 is not permitted to refer to, is encrypted and then transmitted or received. In addition, in a case where the encrypted data is received, the encryption unit 60 decodes the encrypted data. FIG. 5 is a diagram illustrating the image forming system 10 according to the present exemplary embodiment.

Subsequently, a specific process performed by the image forming system 10 according to the present exemplary embodiment configured as described above will be described.

A process performed by the real device 12 in a case of transmitting and receiving data to and from the virtual device 50, and a process performed by the application 70 in a case of transmitting and receiving data to and from the virtual device 50 will be described. Since the process performed by the real device 12 and the process performed by the application 70 are basically the same process, the process performed by the real device 12 will be described as a representative below.

Figure 6:
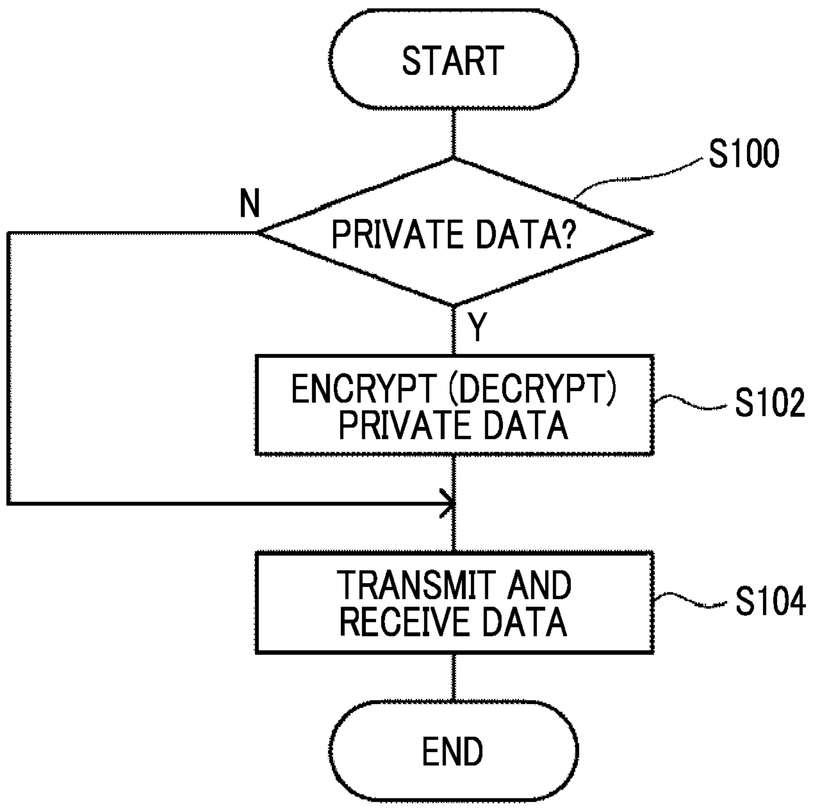
FIG. 6 is a flowchart showing an example of a flow of a process performed by a real device in a case where data is transmitted and received to and from a virtual device, in the image forming system according to the first exemplary embodiment.

FIG. 6 is a flowchart showing an example of a flow of a process performed by the real device 12 in a case where data is transmitted and received to and from the virtual device 50, in the image forming system 10 according to the present exemplary embodiment. In addition, the process of FIG. 6 is started in a case where the virtual device 50 and the real device 12 are synchronized. For example, the process of FIG. 6 is started at a timing at which the data in the real device 12 is updated or at each predetermined time.

In step S100, the CPU 20A determines whether or not data to be transmitted and received is private data. In a case where the determination is positive, the process proceeds to step S102, and in a case where the determination is negative, the process proceeds to step S104. For example, in the example of FIG. 5, in a case where the data to be transmitted and received is the destination table, a positive determination is made and the process proceeds to step S102. On the other hand, in a case where the data is the remaining amount of consumables, a negative determination is made and the process proceeds to step S104.

In step S102, the CPU 20A encrypts (decrypts) the private data and proceeds to step S104. That is, in a case of transmitting the private data to the virtual device 50, the encryption unit 60 encrypts the private data. Further, in a case where the encrypted private data is received from the virtual device 50, the encrypted private data is decrypted.

In step S104, the CPU 20A transmits and receives data to and from the virtual device 50 to end a series of processes.

Second Exemplary Embodiment

Figure 7:
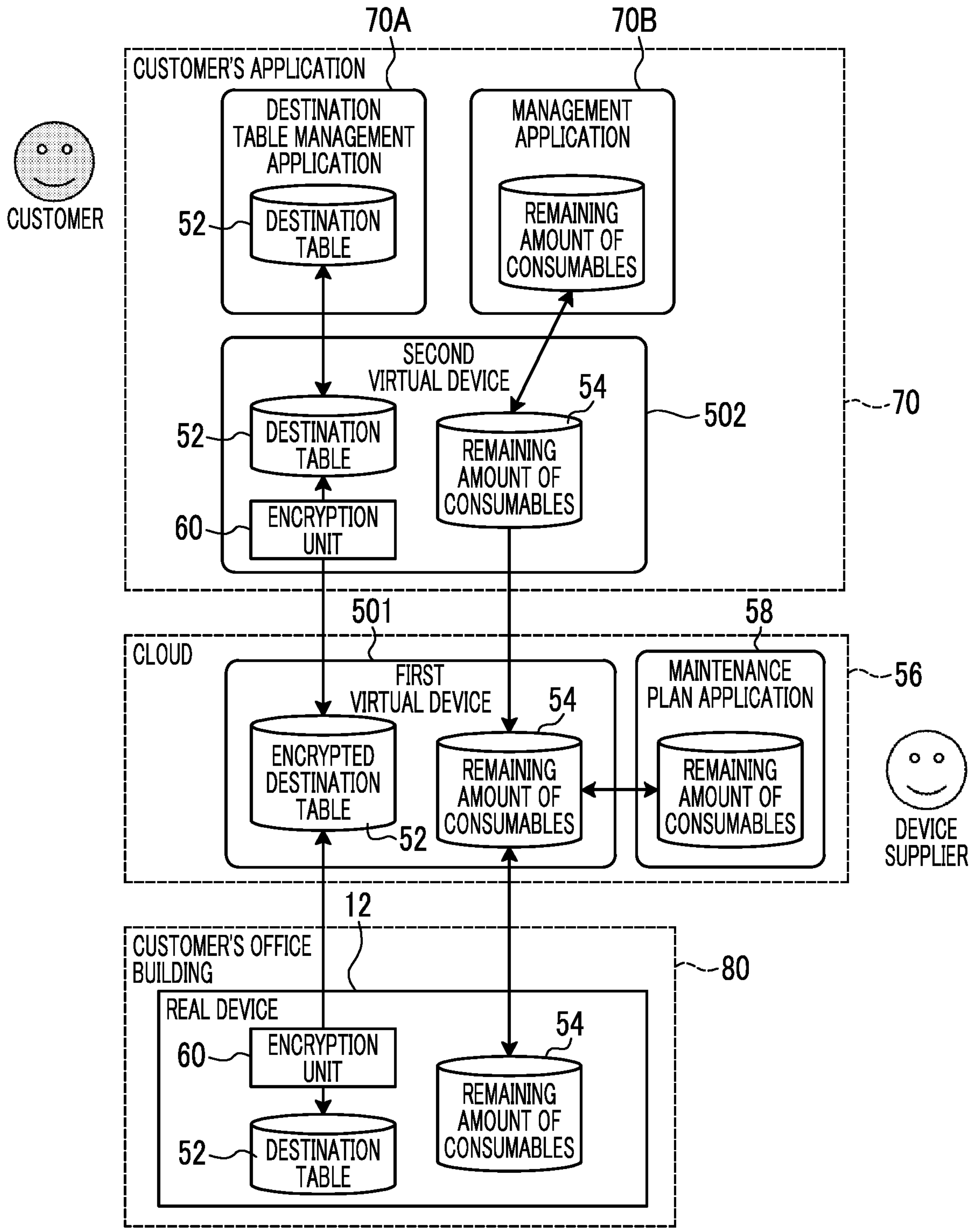
FIG. 7 is a diagram illustrating an image forming system according to a second exemplary embodiment.

Subsequently, an image forming system 10 according to a second exemplary embodiment will be described. FIG. 7 is a diagram illustrating the image forming system 10 according to the present exemplary embodiment.

In the present exemplary embodiment, as shown in FIG. 7, a set of two virtual devices (first virtual device 501 and second virtual device 502) having different administrators is configured.

The first virtual device 501 is managed by the supplier of the real device 12, and the second virtual device 502 is managed by the customer. That is, the first virtual device 501 is provided in the cloud 56 in the same manner as the virtual device 50 of the above exemplary embodiment. On the other hand, the second virtual device 502 is provided as a function of the application 70.

The second virtual device 502 managed by the customer transmits and receives data to and from the real device 12 via the first virtual device 501 managed by the supplier of the real device 12.

The second virtual device 502 separately manages the data (private data) that the administrator of the first virtual device 501 is not permitted to refer to and the data (public data) that the administrator of the first virtual device 501 also refers to. The second virtual device 502 is provided with an encryption unit 60, and the private data is encrypted and transmitted and received to and from the first virtual device 501.

The real device 12 stores data transmitted and received between the real device 12 and the application 70 by distinguishing between public data and private data. Similar to the above exemplary embodiment, the real device 12 is provided with an encryption unit 60, and in a case of transmitting and receiving private data to and from the first virtual device 501, the private data is selectively encrypted by the encryption unit 60 and then transmitted and received such that the private data cannot be referred to by the administrator of the first virtual device 501.

As described above, even in a case where the two virtual devices of the first virtual device 501 and the second virtual device 502 are configured, by performing the process in the same manner as in the above exemplary embodiment, the administrator of the first virtual device 501 cannot snoop on the private data.

Figure 8:
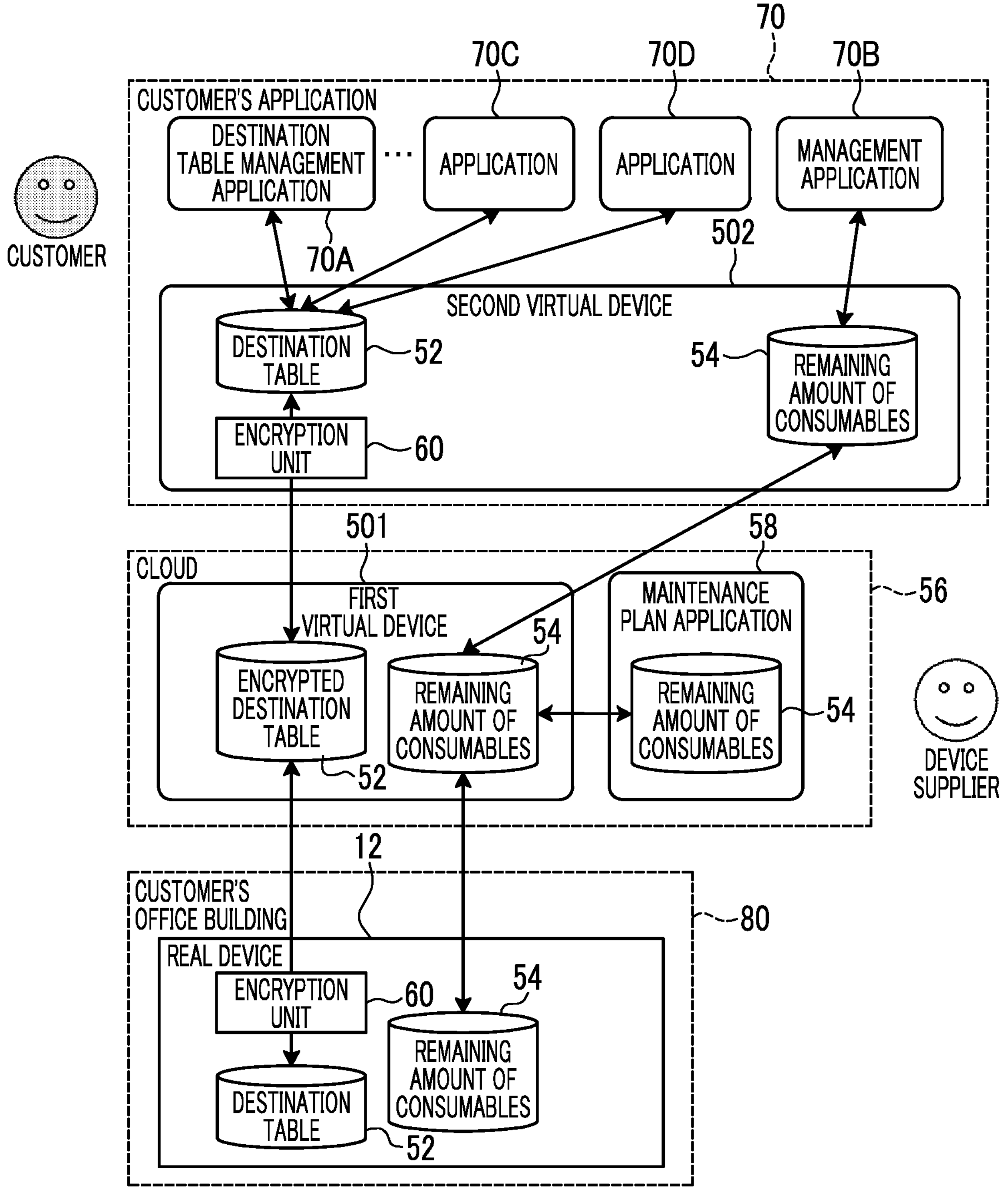
FIG. 8 is a diagram showing a case where there are a plurality of applications that transmit and receive private data with a real device via a second virtual device.

Further, as shown in FIG. 8, in a case where, in addition to the destination management application 70A, there are a plurality of applications (70C, 70D) that transmit and receive private data such as the destination table 52 to and from the real device 12 via the second virtual device 502, each application does not need to have the function of the encryption unit 60, so that the application can be implemented easily and efficiently. FIG. 8 is a diagram showing a case where there are a plurality of applications 70 that transmit and receive private data to and from the real device 12 via the second virtual device 502.

Subsequently, in the second exemplary embodiment, a case where the real device 12 fails and the real device 12 is replaced will be described.

Figure 9:
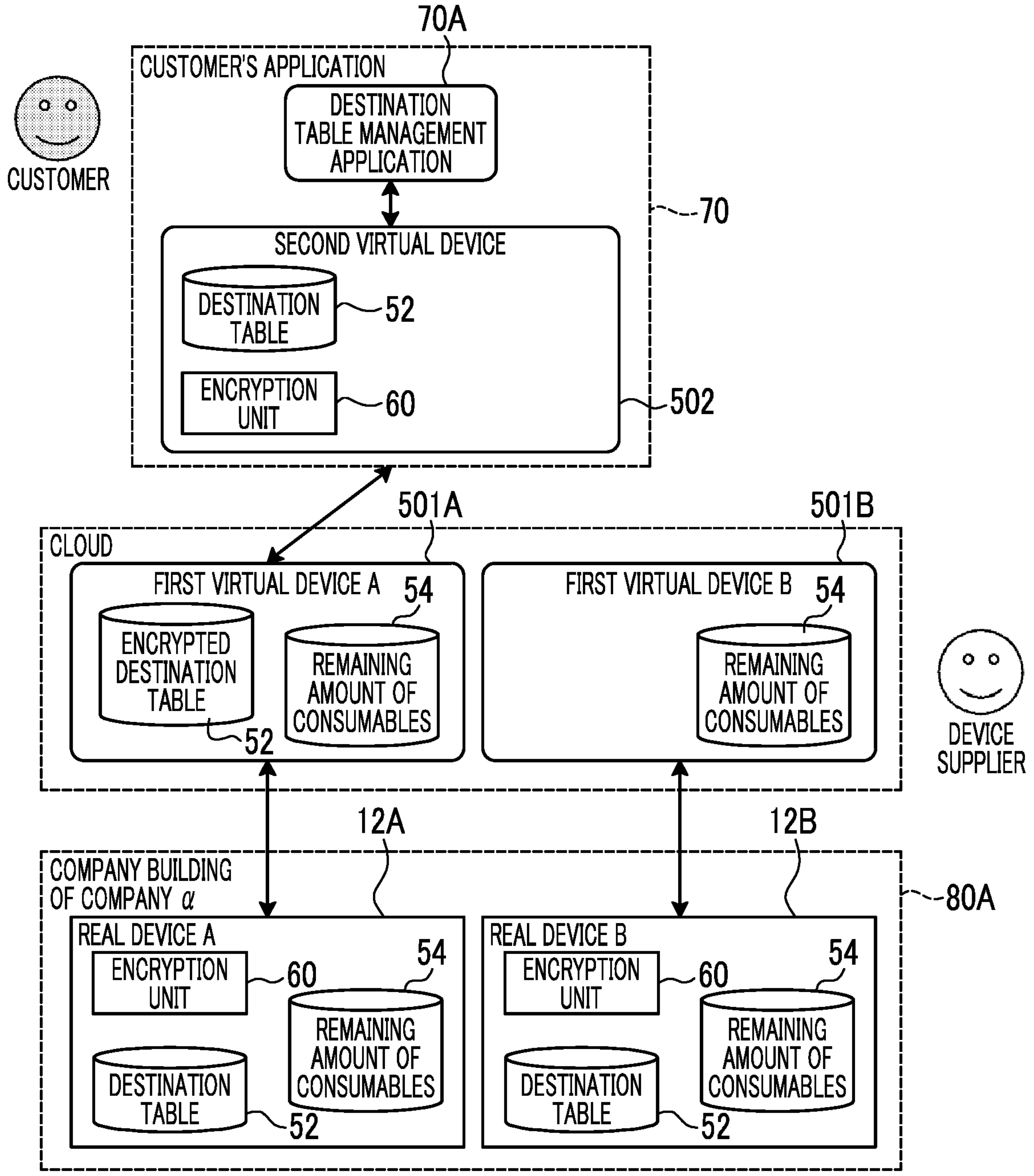
FIG. 9 is a diagram showing a state in which a real device B, which is a substitute for a failed real device A, is carried into a company building of company α.

As shown in FIG. 9, the description will start from a state in which the real device B 12B, which is a substitute for the failed real device A 12A, is carried into the company building 80A of the company α. FIG. 9 is a diagram showing a state in which the real device B 12B, which is a substitute for the failed real device A 12A, is carried into the company building 80A of the company α.

Figure 10:
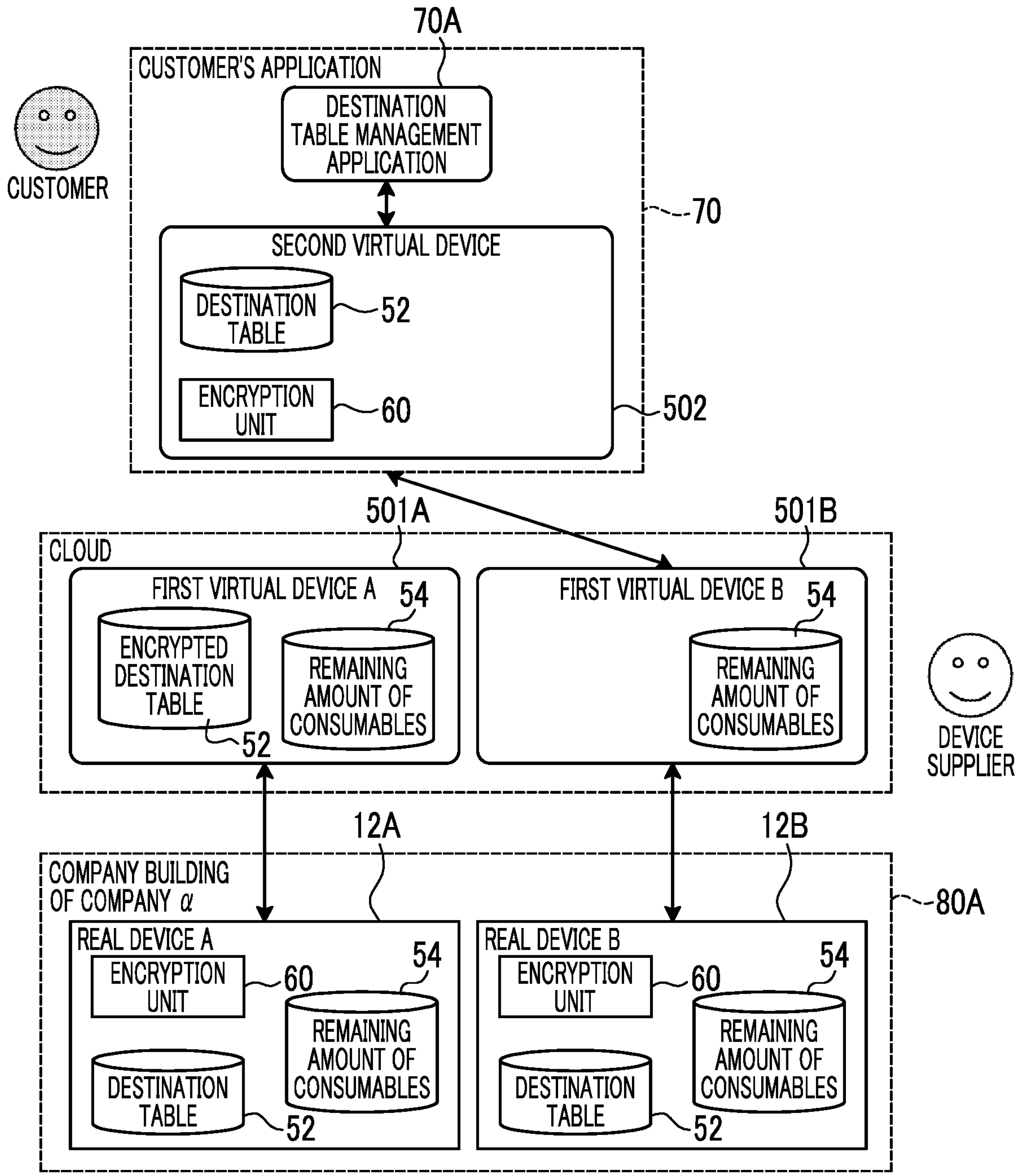
FIG. 10 is a diagram showing a state in which the first virtual device corresponding to the second virtual device is switched from a first virtual device A to a first virtual device B.

By an operation of the administrator of the first virtual device 501 and the administrator of the second virtual device 502, as shown in FIG. 10, the first virtual device 501 corresponding to the second virtual device 502 is switched from the first virtual device A 501A to the first virtual device B 501B. FIG. 10 is a diagram showing a state in which the first virtual device 501 corresponding to the second virtual device 502 is switched from the first virtual device A 501A to the first virtual device B 501B.

Accordingly, the real device B 12B can be used in the same manner as the real device A 12A. Since the second virtual device 502 is not changed for the customer's application 70, there is no influence of the replacement of the real device A 12A with the real device B 12B.

Figure 11:
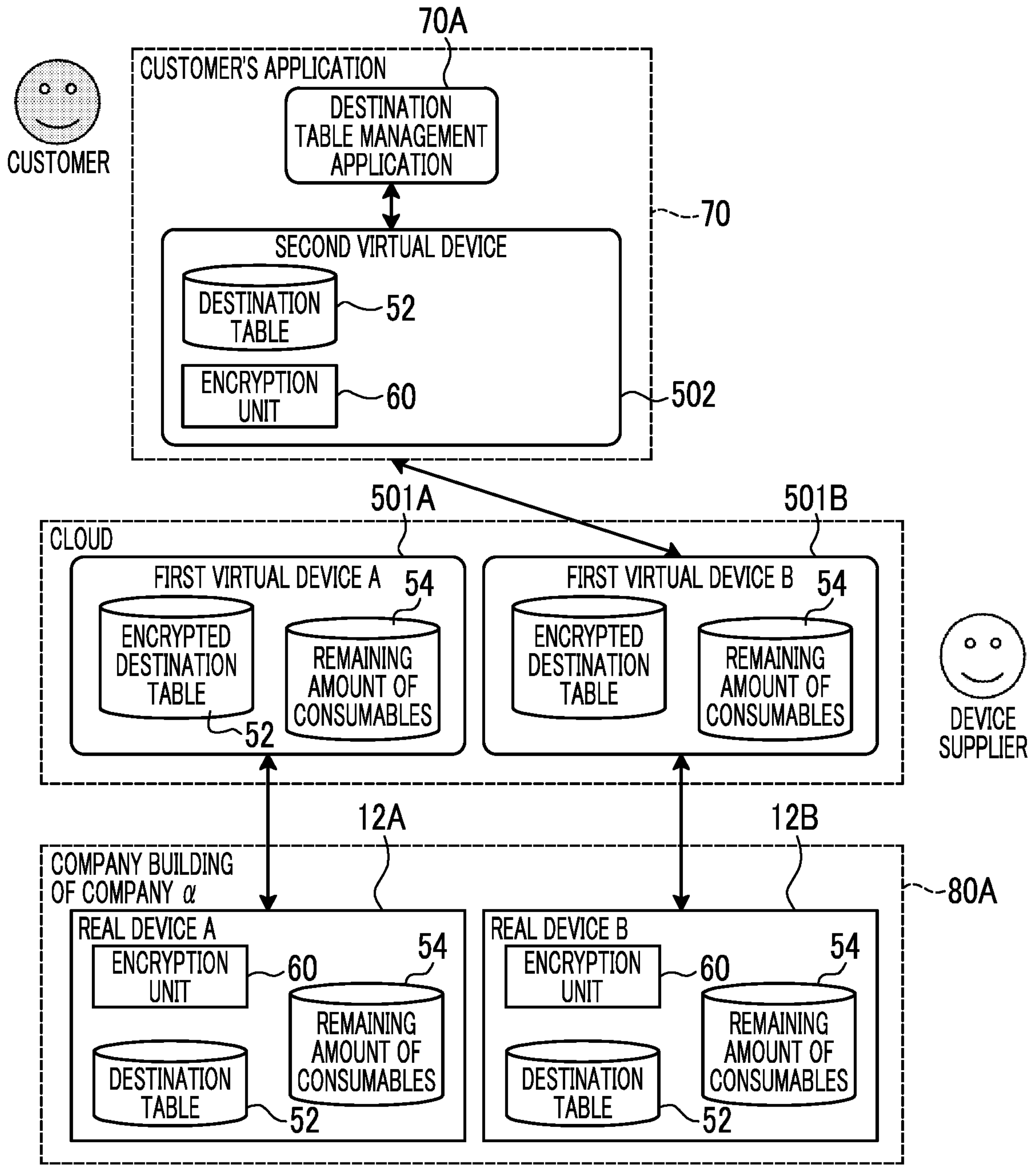
FIG. 11 is a diagram showing a state in which private data in the second virtual device is transferred to the real device B.

Next, the real device B 12B is operated to synchronize the second virtual device 502, and as shown in FIG. 11, private data (destination table 52) in the second virtual device 502 is transferred to the real device B 12B. Thus, the real device B 12B can be used instead of the real device A 12A. FIG. 11 is a diagram showing a state in which the private data in the second virtual device 502 is transferred to the real device B 12B.

Figure 12:
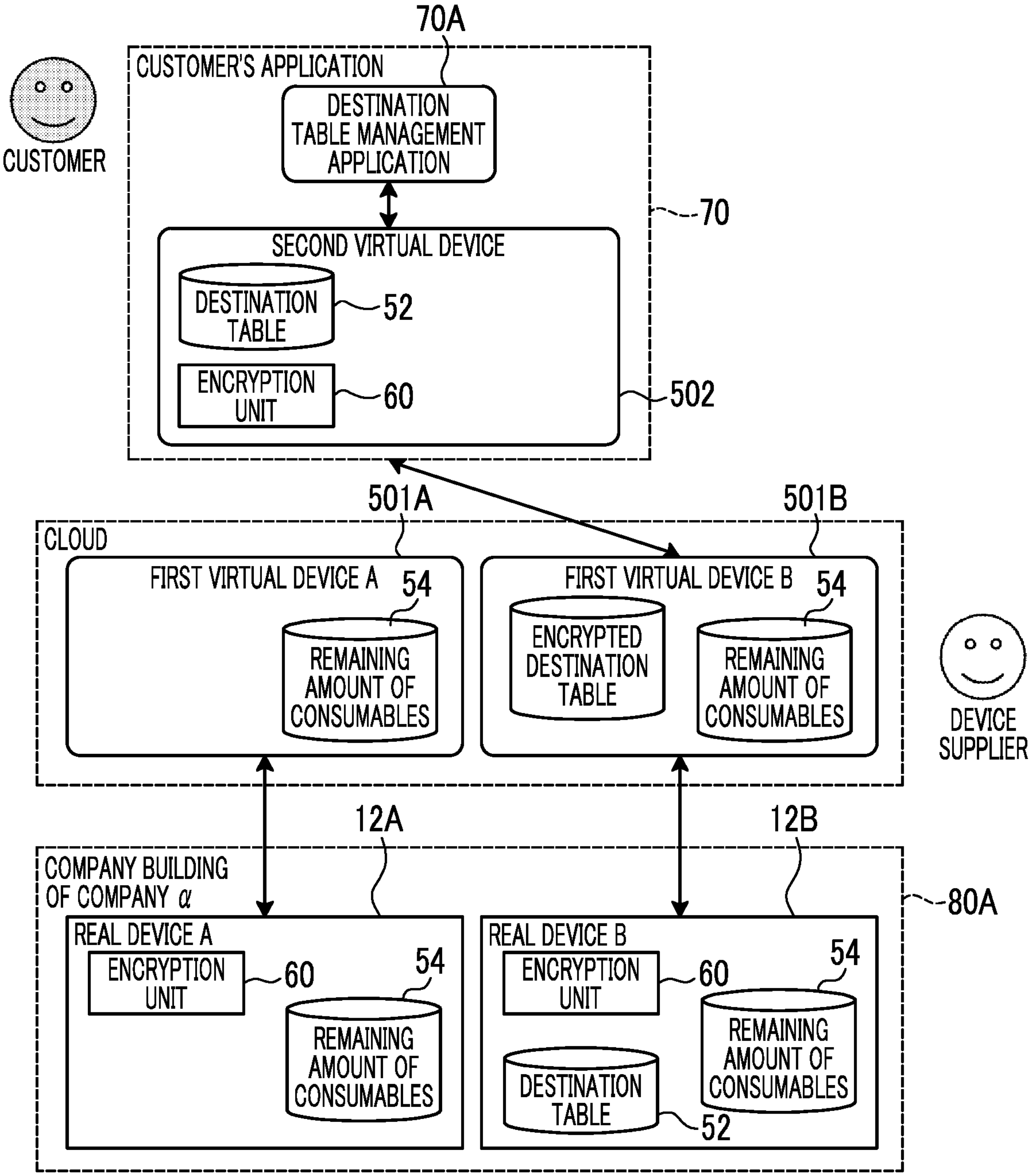
FIG. 12 is a diagram showing a state in which private data (destination table) of the real device A and encrypted private data (destination table) of the first virtual device A are deleted.

After that, as shown in FIG. 12, the real device A 12A is instructed to erase the private data in the real device A 12A, and the real device A 12A instructs the first virtual device A 501A to delete the encrypted private data present in the first virtual device A 501A. The real device A 12A from which the private data has been deleted is carried out from the company building 80A of the company α. FIG. 12 is a diagram showing a state in which the private data (destination table 52) in the real device A and the encrypted private data (destination table 52) in the first virtual device A 501A are deleted.

As a method of associating (particularly disconnecting) the second virtual device 502 on the customer side and the first virtual device 501, disconnection may be performed by operating the real device 12 to send an instruction from the real device 12 to the first virtual device 501. Alternatively, disconnection may be performed by sending an instruction from the application 70 on the customer side to the second virtual device 502 on the customer side.

In the present exemplary embodiment described above, an example of encryption is shown as an example of a format that cannot be referred to by the virtual device 50 (first virtual device 501). However, the format is not limited to encryption, and other methods such as conversion into data in a file format unrecognizable by the virtual device 50 may be applied.

Further, in the above exemplary embodiment, the image forming apparatus 12 has been described as an example of the information processing apparatus, but the information processing apparatus is not limited to the image forming apparatus 12. For example, other apparatuses such as an image processing apparatus may be applied as the information processing apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the process performed in each part of the image forming system 10 according to the above exemplary embodiments may be a process performed by software, a process performed by hardware, or a combination of both. Further, the process performed in each part of the image forming system 10 may be stored in a storage medium as a program and distributed.

Further, the present disclosure is not limited to the above, and it is needless to say that the present invention can be variously modified and implemented within a range not deviating from the gist thereof.

Further, the following supplementary notes will be disclosed with respect to the above exemplary embodiments.

(((1)))

An information processing system comprising:

a server including a first processor configured to function as a virtual device that is provided on a one-to-one basis with a predetermined information processing apparatus and mediates exchange of information between an application and the information processing apparatus;

the information processing apparatus including a second processor, in a case of exchanging predetermined confidential information with the application via the virtual device, the second processor configured to exchange the information by converting the information into a format in which the information is to be referred to by the information processing apparatus and the application and is not to be referred to by the virtual device; and an information processing terminal including a third processor configured to function as the application, and exchange the information by converting the information into a format in which the information is to be referred to by the information processing terminal and the application and is not to be referred to by the virtual device, in a case of exchanging the confidential information with the information processing apparatus via the virtual device.

(((2)))

An information processing system comprising:

a server including a first processor configured to function as a first virtual device that is provided on a one-to-one basis with a predetermined information processing apparatus and mediates exchange of information between an application and the information processing apparatus;

an information processing apparatus including a second processor configured to exchange the information by converting the information into a format in which the information is to be referred to by the information processing apparatus and the application and is not to be referred to by the first virtual device, in a case of exchanging information with the application via the first virtual device, and exchanging predetermined confidential information; and an information processing terminal including a third processor configured to function as a second virtual device that is provided on a one-to-one basis with the information processing apparatus and mediates exchange of the information between the application and the information processing apparatus, in a case of exchanging the information with the first virtual device, and in a case of exchanging predetermined confidential information, the second virtual device exchanging the information by converting the information into a format in which the information is to be referred to by the information processing terminal and the information processing apparatus and is not to be referred to by the first virtual device.

(((3)))

The information processing system according to (((1))) or (((2))), wherein the second processor and the third processor are configured to:

convert the information into the format through encryption.

(((4)))

An information processing terminal comprising:

a processor configured to:

function as a second virtual device that is provided on a one-to-one basis with a predetermined information processing apparatus and mediates exchange of the information between an application of the information processing terminal and the information processing apparatus, in a case of exchanging information with a first virtual device that is provided on a one-to-one basis with the information processing apparatus and mediates exchange of information with the application and the information processing apparatus, wherein in a case of exchanging predetermined confidential information, the second virtual device exchanges the information by converting the information into a format in which the information is to be referred to by the information processing terminal and the information processing apparatus and is not to be referred to by the first virtual device.

(((5)))

The information processing terminal according to (((4))), wherein the processor is configured to:

convert the information into a format in which the information is not to be referred to by the first virtual device, through encryption.

(((6)))

The information processing terminal according to (((4))) or (((5))), wherein the second virtual device is provided corresponding to a plurality of the applications and mediates the exchange of information between the plurality of applications and the information processing apparatus.

(((7)))

A non-transitory computer readable medium storing an information processing program causing a computer to execute:

a process of functioning as a virtual device that is provided on a one-to-one basis with a predetermined information processing apparatus and mediates exchange of information between an application and the information processing apparatus;

a process of exchanging information by converting the information into a format in which the information is to be referred to by the information processing apparatus and the application and is not to be referred to by the virtual device, in a case of exchanging predetermined confidential information with the application via the virtual device; and a process of functioning as the application, and exchanging the information by converting the information into a format in which the information is to be referred to by the information processing terminal and the application and is not to be referred to by the virtual device, in a case of exchanging the confidential information with the information processing apparatus via the virtual device.

(((8)))

A non-transitory computer readable medium storing an information processing program causing a computer to execute:

a process of functioning as a second virtual device that is provided on a one-to-one basis with a predetermined information processing apparatus and mediates exchange of the information between an application of the information processing terminal and the information processing apparatus, in a case of exchanging information with a first virtual device that is provided on a one-to-one basis with the information processing apparatus and mediates exchange of information with the application and the information processing apparatus; and a process of, in a case of exchanging predetermined confidential information, the second virtual device exchanging the information by converting the information into a format in which the information is to be referred to by the information processing terminal and the information processing apparatus and is not to be referred to by the first virtual device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a server including a first processor configured to function as a first virtual device that is provided on a one-to-one basis with a predetermined information processing apparatus and mediates exchange of information between an application and the information processing apparatus;

an information processing apparatus including a second processor configured to exchange the information by converting the information into a format in which the information is to be referred to by the information processing apparatus and the application and is not to be referred to by the first virtual device, in a case of exchanging information with the application via the first virtual device, and exchanging predetermined confidential information; and an information processing terminal including a third processor configured to function as a second virtual device that is provided on a one-to-one basis with the information processing apparatus and mediates exchange of the information between the application and the information processing apparatus, in a case of exchanging the information with the first virtual device, and in a case of exchanging predetermined confidential information, the second virtual device exchanging the information by converting the information into a format in which the information is to be referred to by the information processing terminal and the information processing apparatus and is not to be referred to by the first virtual device.

2. An information processing terminal comprising:

a processor configured to:

function as a second virtual device that is provided on a one-to-one basis with a predetermined information processing apparatus and mediates exchange of the information between an application of the information processing terminal and the information processing apparatus, in a case of exchanging information with a first virtual device that is provided on a one-to-one basis with the information processing apparatus and mediates exchange of information with the application and the information processing apparatus, wherein in a case of exchanging predetermined confidential information, the second virtual device exchanges the information by converting the information into a format in which the information is to be referred to by the information processing terminal and the information processing apparatus and is not to be referred to by the first virtual device.

3. The information processing terminal according to claim 2, wherein the processor is configured to:

convert the information into a format in which the information is not to be referred to by the first virtual device, through encryption.

4. The information processing terminal according to claim 2, wherein the second virtual device is provided corresponding to a plurality of the applications and mediates the exchange of information between the plurality of applications and the information processing apparatus.

* * * * *